(12) United States Patent
Jactat et al.

(10) Patent No.: US 9,027,081 B2
(45) Date of Patent: May 5, 2015

(54) SECURE NETWORK CONNECTION ALLOWING CHOICE OF A SUITABLE SECURITY ALGORITHM

(75) Inventors: Caroline Jactat, Berkshire (GB); Vincent Roger, Berkshire (GB); Antoine Vallee, Berkshire (GB); Anand Raghawa Prasad, Tokyo (JP)

(73) Assignee: Lenovo Innovations Limited (Hong Kong), Quarry Bay (HK)

( * ) Notice: Subject to any disclaimer, the term of this patent is extended or adjusted under 35 U.S.C. 154(b) by 0 days.

(21) Appl. No.: 13/381,274

(22) PCT Filed: Jun. 23, 2010

(86) PCT No.: PCT/JP2010/061097
§ 371 (c)(1),
(2), (4) Date: Dec. 28, 2011

(87) PCT Pub. No.: WO2011/001993
PCT Pub. Date: Jan. 6, 2011

(65) Prior Publication Data
US 2012/0117619 A1    May 10, 2012

(30) Foreign Application Priority Data
Jun. 29, 2009  (GB) .................................. 0911118.8

(51) Int. Cl.
*G06F 21/00* (2013.01)
*H04W 12/02* (2009.01)
*H04L 29/06* (2006.01)

(52) U.S. Cl.
CPC ............. *H04W 12/02* (2013.01); *H04L 63/205* (2013.01)

(58) Field of Classification Search
CPC ....................................................... G06F 21/00
See application file for complete search history.

(56) References Cited

U.S. PATENT DOCUMENTS

| 7,251,227 B2 * | 7/2007 | de Jong et al. ................ 370/331 |
| 2003/0003358 A1 | 1/2003 | Mandal et al. |
| 2006/0294575 A1 * | 12/2006 | Rogers .............................. 726/1 |
| 2009/0029697 A1 * | 1/2009 | Bianconi et al. ............ 455/432.3 |
| 2010/0002883 A1 * | 1/2010 | Sammour et al. ............. 380/272 |
| 2010/0263021 A1 * | 10/2010 | Arnott et al. ....................... 726/1 |

FOREIGN PATENT DOCUMENTS

| CN | 101222320 A | 7/2008 |
| CN | 101242360 A | 8/2008 |
| CN | 101262337 A | 9/2008 |

(Continued)

OTHER PUBLICATIONS

"3rd Generation Partnership Project; Technical Specification Group Services and System Aspects; 3GPP System Architecture Evolution (SAE): Security Architecture; (Release 8)", 3GPP TS 33.401, Technical Specification, Jun. 2009, pp. 1-95, No. V8.4.0.

(Continued)

*Primary Examiner* — William Powers

(57) ABSTRACT

The invention provides for a method for use in a mobile radio communications device network connection procedure and including the step of, at a network, sending to a mobile radio communications device a list of a plurality of security algorithms supported in the network and so as to allow choice of a suitable algorithm irrespective of the degree of update that the device may have experienced.

15 Claims, 3 Drawing Sheets

(56) References Cited

FOREIGN PATENT DOCUMENTS

| | | |
|---|---|---|
| CN | 101374153 A | 2/2009 |
| EP | 1 895 706 A1 | 3/2008 |
| EP | 2 007 110 A1 | 12/2008 |
| GB | 2 454 204 A | 5/2009 |
| JP | 2008533802 A | 8/2008 |
| WO | WO 2005/032201 A1 | 4/2005 |
| WO | 2006096017 A1 | 9/2006 |
| WO | 2009/057730 A2 | 5/2009 |

OTHER PUBLICATIONS

International Search Report for PCT/JP2010/061097 dated Dec. 1, 2010.
Office Action for GB 0911118.8 dated Oct. 23, 2009.
Japanese Office Action, dated Jul. 16, 2013, issued by the Japanese Patent Office in counterpart Application No. 2012-517085.
Communication dated Aug. 12, 2014 from the Korean Intellectual Property Office in counterpart Korean Patent Application No. 10-2011-7030826.

* cited by examiner

SECURE NETWORK CONNECTION ALLOWING CHOICE OF A SUITABLE SECURITY ALGORITHM

CROSS REFERENCE TO RELATED APPLICATIONS

This application is a National Stage of International Application No. PCT/JP2010/061097 filed on Jun. 23, 2010, which claims priority from United Kingdom Patent Application No. 0911118.8, filed on Jun. 29, 2009, the contents of all of which are incorporated herein by reference in their entirety

TECHNICAL FIELD

The present invention relates to a method for use in mobile radio communications network connection, and to a mobile radio communications device, and network device, arranged to achieve such connection.

This application is based upon and claims the benefit of priority from United Kingdom patent application No. 0911118.8, filed Jun. 29, 2009, the disclosure of which is incorporated herein in its entirety by reference.

BACKGROUND ART

For mobile radio communication devices such as User Equipment (UE) handsets operating in relation to mobile communication networks, various security-related procedures arise at the time of seeking network connection, whether at the time of initial connection or when the UE is required to handover from one network to another. Such handover procedures can involve handovers between different network technologies particularly as communication systems and there underlying technologies evolve.

Security algorithms are generally provided in order to achieve, and maintain, ongoing secure communication between the UEs and the network and it is quite common for the Core Network (CN) to provide the required security algorithm on the basis of the security capabilities of the UE.

Problems and potential limitations have however been found to arise due to the potential for differences in security algorithms arising in particular, subsequent to a change in algorithm due to an upgrade such that one of a UE or a network device is not fully upgraded for use solely with a new algorithm.

The security of ongoing data transfer can then be compromised through the ongoing use of the possibly now out of date, or unsupported and unwanted algorithm.

Various network systems and devices are known relating to security issues and, in particular, security algorithm creation and negotiation such as, for example, found in Chinese Patent Applications CN10124236G, CN101374153, CN101222320 and U.S. patent application US 2006/294575.

While aspects of network security are covered by these earlier applications, none seeks to address the problems now identified and as overcome by the present invention concerning the use of old and potentially unsupported algorithms, and due to the differences in security capabilities that can arise as security algorithms are updated.

DISCLOSURE OF INVENTION

The present invention seeks to provide for a network connection method, and related mobile radio communication and network devices having advantages over known such methods and devices and which, in particular, can offer a high degree of ongoing communication security subsequent to improvements and changes in the security capabilities as represented by the security algorithms.

According to a first aspect of the present invention, there is provided a method for use in a mobile radio communications device network connection procedure and including the step of, at a network, sending to a mobile radio communications device a list of a plurality of security algorithms supported in the network.

It is advantageously found that the employment of such a list of security algorithms within the signal from the network allows for the optimum choice of an appropriate security algorithm, irrespective of whether the mobile radio communications device has been upgraded to support a new security algorithm, and given the combined security capabilities of the mobile radio communications device and the network.

Advantageously, the list of the plurality of security algorithms comprises a prioritized list.

The employment of a prioritized list of security algorithms allows the mobile radio communications device to remain in connected mode whilst achieving an optimum level of security since the actual security algorithm to be used can be negotiated based on the network list of prioritized security algorithms and the mobile radio communication device's knowledge of supported algorithms. Of course, for backward compatibility purposes, the network's most prioritized security algorithms are indicated first in the signalling message, and an additional information element can be included serving to indicate the remaining prioritized security algorithms in decreasing order of priority. Then, if required, the mobile radio communications device can produce more than one security algorithm.

Preferably, the security algorithm selected at the mobile radio communications device, having regard to said list, is subsequently indicated to the network.

In particular, the indication can be included within a connection or handover confirm signal which, for example, can comprise the AS handover confirm signal including the selected AS security algorithm.

Preferably, the "confirm" signal can be unciphered and integrity protected with the selected algorithm.

Further, the selection of the security algorithm can also be included within registration update request signalling which can of course comprise NAS registration update request signalling including a selected NAS security algorithm.

This is particularly so if the mobile radio communications device does not support an old security algorithm.

Further, the registration update request signalling can be integrity protected with the selected security algorithm.

In a further embodiment of the present invention, the method can include the step of, at the mobile radio communications device, signalling a list of supported security algorithms.

Further, a list of unsupported security algorithms can also be included.

Advantageously, registration update requests signalling can be employed to include the list of supported and, if present, unsupported, security algorithms.

This is so particularly if the mobile radio communication device supports the/an old security algorithm.

In this manner, the method can further include the step of selecting, at the network, a security algorithm indicated in the mobile radio communications device signalling as a supported algorithm.

Further, the algorithm selected at the network is then indicated within security mode signalling to the mobile radio communications device.

According to another aspect of the present invention, there is provided a mobile radio communications device arranged for pursuing a network connection procedure and, in particular, arranged to receive signalling from the network providing a list of security algorithms supported by the network.

Preferably, the mobile radio communications device is arranged to receive a prioritized list.

Further, the device is arranged to select one of the listed security algorithms and to provide signalling to indicate which of the security algorithms has been selected.

The device can in particular be arranged to provide an indication of the selected security algorithm within connection, or handover, confirmation signalling.

The device can further be arranged to confirm the selected security algorithm within registration update request signalling.

Further, the device can be arranged to signal to the network a list of supported security algorithms in response to receipt of the list of algorithms provided by the network.

The list can also include a separate indication of unsupported security algorithms.

Preferably, the mobile radio communications device is arranged to signal its list of supported algorithms within registration update request signalling.

According to yet another aspect of the present invention, there is provided a mobile radio communications network device arranged for signalling to a mobile radio communications device a list of supported security algorithms.

Preferably, said list comprises a prioritized list of security algorithms.

The mobile radio communications network device can further be arranged to receive signalling from the mobile radio communications device serving to indicate which of the listed security algorithms has been selected for adoption by the mobile radio communications device.

According to another feature of the invention, the mobile radio communications network device can be arranged to receive signalling from the mobile radio communications device comprising a list of supported and unsupported security algorithms within the mobile radio communications device.

The mobile radio communications device can then be arranged to select a security algorithm indicated as supported by the mobile radio communications device.

The invention proves particularly useful when, for example, network connection of a UE to a EPS network is required, and on the basis of UE EPS security capabilities.

As in any case will be appreciated, the invention provides for ongoing resilience on unsupported EPS security algorithms.

BRIEF DESCRIPTION OF THE DRAWINGS

The present invention is described further hereinafter, by way of example only, with reference to the accompanying drawings in which.

BEST MODE FOR CARRYING OUT THE INVENTION

Figure 1:
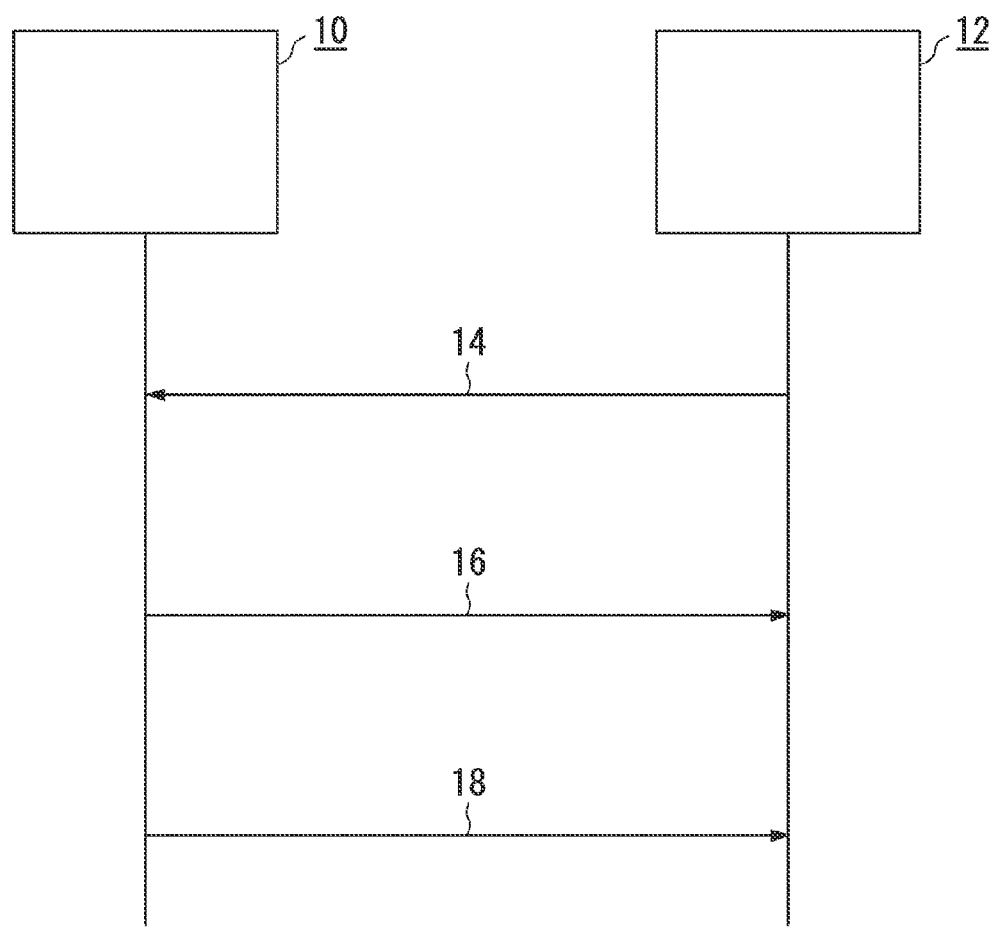
FIG. 1 is a signalling diagram relating to a UE and an associated EPS network and employing signalling arising in accordance with a method embodying the present invention.

As discussed further below, the illustrated examples of the present invention are provided in relation to an attempted handover procedure to a EPS network and involving consideration of the relevance and degree of support of the Long Term Evolution (LTE) algorithms at both AS and NAS level.

The invention proves particularly useful when, for example, network connection of a UE to an EPS network is required and on the basis of UE EPS security capabilities. A particular illustrated embodiment of the present invention seeks to overcome the disadvantages as hereinbefore described in relation to the current art and, and as a particular example of such limitations, those found at the time of connection/handover between a UE and a EPS network.

As will be clarified from the following discussion, the invention proves advantageous in overcoming potential security failures that can arise from a potential imbalance between the security algorithms supported by, or employed within, the UE and the network both when, for example, handover is attempted between a suitably upgraded UE and a correspondingly upgraded network, and also a non-upgraded UE and an upgraded network.

In particular, in a situation in which the EPS network does not possess any indication as to the UE EPS security capabilities, for example, if the UE is handed over from a pre-Release 8 network, and a security algorithm is not supported anymore by the UE and the network, the communication between the UE and the network cannot make use of a new security algorithm that might be available at that time.

Also, a new EPS security algorithm can be deployed within the network, and there is provided a method for the network to allow a UE to connect towards the 3GPP LTE access technology even if the UE supports an unwanted (i.e. update no longer supported) security algorithm while the network is already upgraded not to support the unwanted algorithm.

Currently, the connection between the UE and the network is not able to make use of a new EPS security algorithm and so subsequent communication between the UE and the network makes use of alternatives which, from a security point of view can be considered far less robust than the new (upgraded) security algorithm.

Within the context of the present application, a so-called "new" UE or network is considered to be a UE or network that no longer supports an old security algorithm inasmuch as it has been upgraded to support a new security algorithm that is available.

Conversely, an "old" UE or network is a UE or a network that still supports an old security algorithm even though possible updates are available.

Of course, it should be appreciated that such a security algorithm can be related to "integrity protection" or "ciphering" and, as examples, a default set of EPS security algorithms comprises AES based algorithm for encryption such as EA0 NULL algorithm, 128-EEA1, and SNOW 3G based algorithm and 128-EEA2.

Examples of an AES for integrity protection comprise 128-EIA1 SNOW 3G and 128-EIA2.

It should be appreciated that a so-called old algorithm can form part of the default set of EPS security algorithms (for example from 3GPP Release 8) or can be part of 3GPP Release 8 version.

Whilst, for example, a EPS NAS or AS security algorithm is no longer considered up-to-date insofar as it might have become compromised, then, while a new replacement algorithm is being established within the network has not yet been adopted by the UE, it is a particular advantage of the present invention that the old UE is still able to connect to the network.

Yet further, it is particularly useful for a new UE to be able to use the new EPS security algorithm.

In general therefore, it can prove highly probable that, while a EPS security algorithm is not supported anymore a new EPS security algorithm is about to be adopted and supercede that old one from a time that it is recognised that the older EPS security algorithm is no longer required. There will then be an ever decreasing number of UEs and networks still supporting the "unwanted" EPS security algorithm. As will be appreciated from the following, the present invention advantageously provides for a new network to prioritize the new EPS security algorithm, whilst also maintaining functionality to prevent any problems arising and wherein the network has the capability to instigate a recovery action if it is transpires that the network encounters an old UE requiring connection/handover.

While, at present, when a UE is requested from a pre-Release 8 network which does not have the UE EPS security capabilities, to perform, for example, a handover to the EPS network, the UE will in any case accept the handover which leads to the possibility that data exchange between the UE and the network may use an alternative existing EPS security algorithm which, from a security standpoint, may be considered less robust than the new upgraded algorithms.

Turning now to FIG. 1, there is illustrated a signal timing diagram concerning signalling portions relevant to the present invention and arising between a UE 10 and a network 12, and wherein the UE 10 comprises a "new" UE insofar as it has been upgraded to support a new security algorithm, and wherein the network 12 likewise comprises a "new" network also upgraded for the new security algorithm.

It should be appreciated that the signalling arising in relation to FIG. 1 relates to a potential handover procedure initiated by a AS handover command message 14 delivered from the new network 12 to the new UE 10. Insofar as the network had no knowledge of the UE EPS security capabilities of the new UE 10, and according to the present invention, a list of possible prioritized security algorithms is included within the AS handover command 14 wherein each of an AS security container, and a NAS security container, includes such a list of prioritized security algorithms.

Within a AS handover confirmation message 16 returned from the new UE 10 to the new network 12, there is provided an indication of a selected one of the AS security algorithms listed within the AS handover command 14.

Such an AS handover confirmation 16 is established from the UE 10 selecting among its supported security algorithms the highest prioritized algorithm according to the list received from the network. Further, the AS handover confirm signal 16 is unciphered so as to allow the recipient to infer the selected algorithm and the signalling message 16 is further integrity protected with the actual selected security algorithm.

Subsequent to the AS handover confirm signal 16, a NAS registration update request message 18 is delivered from the new UE 10 to the new network 12 and which likewise includes the selected NAS security algorithm. In this manner, the NAS registration update request signalling message 18 is integrity protected with the selected security algorithm.

Thus, as illustrated, the new network 12 does not know the UE EPS security capabilities of the new UE 10 proposes a prioritized list of security algorithms to the UE 10 one of which is then selected for use by the UE along with conformation of the selection being provided to the network 12.

Figure 2:
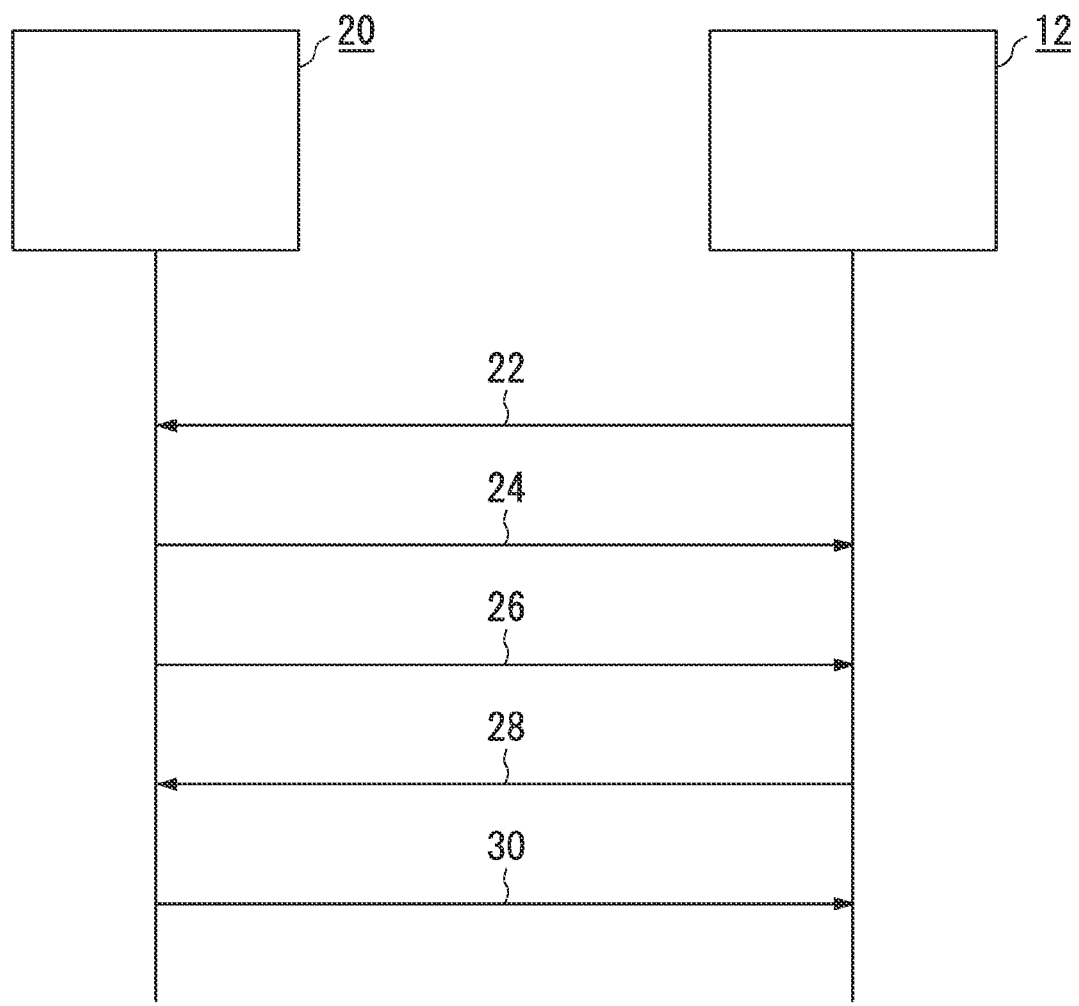
FIG. 2 is a further signalling diagram between a UE and an associated EPS network and again employing signalling arising in accordance with another aspect of the method embodying the present invention.

Turning now to FIG. 2, there is provided a similar signalling diagram but this time relating to signalling arising between a new network 12 and an old user equipment 20.

The illustrated signalling again commences with a AS handover command 22 and, insofar as the network 12 has no knowledge of the UE EPS security capabilities of the old UE 20, it again includes a list of prioritized security algorithms and so includes both an AS and NAS security container including a list of the prioritized security algorithms.

The old UE 20 then returns its AS handover confirmation signalling message 24 and, in addition to being unciphered, the message is also not integrity protected insofar as the UE 20 does not support the new EPS security algorithm indicated by the network.

Subsequently, the old UE 20 then sends a NAS registration update request signalling message 26 to the new network 12 which includes a list of both supported and unsupported, EPS security algorithms.

Upon receipt of the NAS registration update request signalling message 26, the new network 12 initiates a AS security mode command message 28 which is delivered to the old UE 20 and which includes an indication of a selected AS security algorithm on the basis of the list of supported and unsupported algorithms contained within the signalling message 26.

That is, from the previous unciphered and not integrity protected AS handover confirm message 24, the network 12 triggers the AS security based on the UE's list of supported EPS security algorithms in the NAS registration update request signalling message 26, by selecting an EPS security algorithm supported by the UE 20 and different from the unsupported/unwanted algorithm.

As should be appreciated in particular from the aforementioned illustrated embodiments of the present invention, the invention proves particularly advantageous insofar as it can prevent the loss of data and further allow the UE to remain in connected mode. In particular, the particular security algorithm is negotiated on the basis of the networks list of prioritized security algorithms, and if required, also on the basis of the UE's list of supported algorithms. For the purposes of potential backward compatibility, the networks most prioritized security algorithms are indicated first in the network message, and an additional information element serves to indicate that a main prioritized security algorithms in decreasing order. It can then prove possible for the UE to choose between more than one security algorithm as appropriate.

Figure 3:
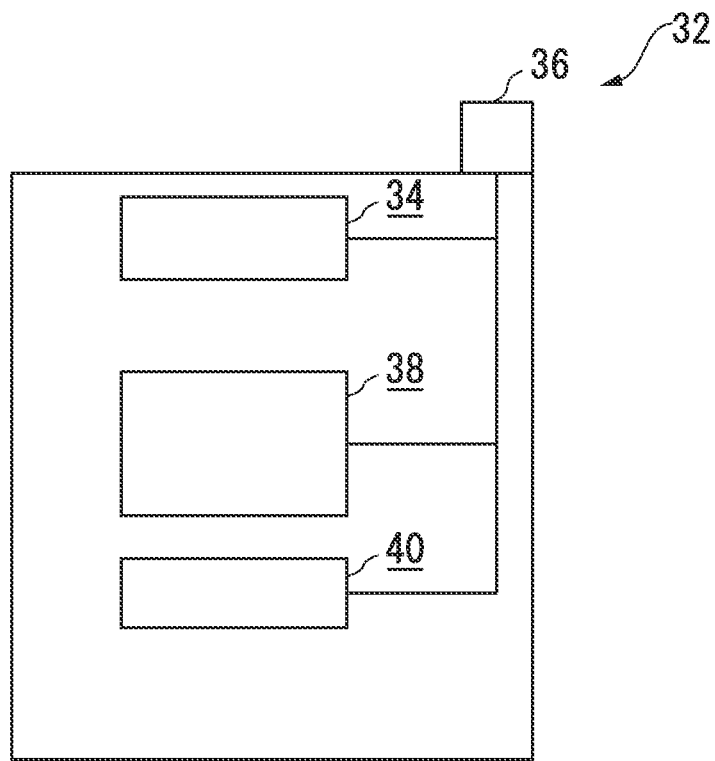
FIG. 3 is a block schematic diagram for a mobile radio communications device UE employing the present invention.

Turning now to FIG. 3, there is provided a schematic representation of a UE device handset 32 for use in accordance with the present invention.

The handset 32 includes standard transceiver functionality 34 associated with a handset antenna 36, and standard processing 38 and memory 40 capabilities.

In accordance with the present invention however, the processing 38 capability of the handset 32 can include means for receiving a list of prioritized security algorithms from the network and as required, selecting one of those security algorithms, or providing separately a list of supported and unsupported security algorithms for subsequent selection by the network.

Figure 4:
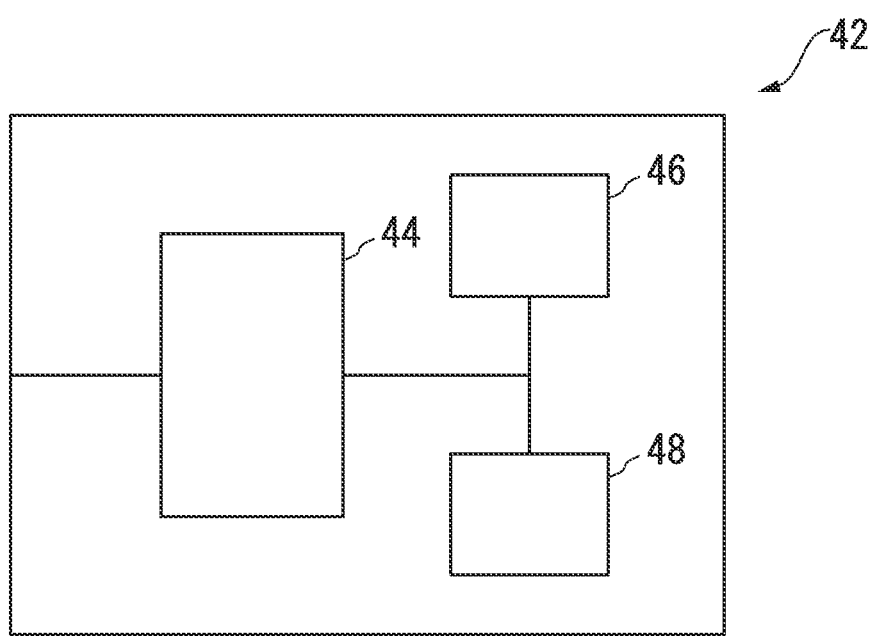
FIG. 4 is a block schematic representation of a network device according to one aspect of the present invention.

Turning lastly to FIG. 4, there is provided a schematic block diagram representing a communications network device 42 having transceiver functionality 44, and processing 46 and memory 48 functionality as illustrated.

For such mobile radio communications network device 42, the processing 46 functionality can include means for delivering a list of prioritized security algorithms to a UE device such as the device 32 as illustrated in FIG. 3 and can further be arranged to select one of the security algorithms indicated as supported by the UE.

It will therefore be appreciated that the UE of FIG. 3 and the network device of FIG. 4 can combine functionally within a mobile radio communications network so as to operate in accordance with the method illustrated with reference to FIGS. 1 and 2.

It should therefore be appreciated that the various communication network devices and method of operation provided by the present invention proves advantageous in providing an improved degree of resilience in relation to unsupported EPS security algorithms although it should be appreciated that the invention is not restricted to the details of the specific foregoing embodiments. In particular, any appropriate connection scenario can benefit from the present invention and not merely just the LTE handover procedure illustrated.

Through use of the present invention, ongoing communication between the UE and the network can generally be based upon an appropriately supported security algorithm so as to advantageously maintain connectivity and an appropriate level of security as required.

INDUSTRIAL APPLICABILITY

The present invention can be applied to a network connection method, mobile radio communication and network devices. According to the network connection method, mobile radio communication and network devices, it is possible to offer a high degree of ongoing communication security subsequent to improvements and changes in the security capabilities as represented by the security algorithms.

The invention claimed is:

1. A method for use in a mobile radio communications device network connection procedure, the method comprising:
   at a network, sending to a mobile radio communications device a first list of a plurality of security algorithms supported in the network including both an Access-Stratum (AS) and Non-Access-Stratum (NAS) security container, the network being an upgraded network and the mobile radio communications device being a non-upgraded device;
   at the mobile radio communications device, in response to receiving the first list of the plurality of security algorithms supported in the network, sending an AS confirmation message, which is not integrity protected, and subsequently sending a NAS registration update message and a second list including supported security algorithms and unsupported security algorithms in the mobile radio communications device, the unsupported security algorithms being indicated separately from the supported security algorithms; and
   at the network, generating and sending an AS security mode command message upon receipt of the NAS registration message based on the second list provided to the network.

2. A method as claimed in claim 1, wherein the first list comprises a prioritized list.

3. A method as claimed in claim 1, wherein the first list includes a prioritized list of security algorithms, and an indication of a security algorithm as selected from the prioritized list at the mobile radio communications device is indicated to the network.

4. A method as claimed in claim 3, wherein said indication is included within a handover confirm signal.

5. A method as claimed in claim 4, wherein the handover confirm signal is unciphered and integrity protected with the selected security algorithm.

6. A method as claimed in claim 3, wherein an indication of the selected security algorithm is included within registration update request signaling if the mobile radio communication device does not support an old security algorithm.

7. A method as claimed in claim 6, wherein the registration update request signaling is integrity protected with the selected security algorithm.

8. A method as claimed in claim 1, wherein registration update request signaling is employed to include said second list comprising the supported security algorithms if the mobile radio communications device supports an old security algorithm.

9. A method as claimed in claim 8, further including the step of selecting, at the network, a security algorithm indicated in the mobile radio communications device signaling as a supported algorithm.

10. A method as claimed in claim 9, wherein the algorithm selected at the network is indicated within security mode signaling to the mobile radio communications device.

11. A method as claimed in claim 1, wherein the second list expressly indicates the unsupported security algorithms.

12. A mobile radio communications device, comprising:
    a processor configured to:
    receive, from a network, a first list of security algorithms supported by the network including both an Access-Stratum (AS) and Non-Access-Stratum (NAS) security container, the network being an upgraded network and the mobile radio communications device being a non-upgraded device;
    send an AS confirmation message, which is not integrity protected, and subsequently sending a NAS registration update message and a second list including supported security algorithms and unsupported security algorithms in the mobile radio communications device in response to receiving the first list of a plurality of security algorithms supported in the network, the unsupported security algorithms being indicated separately from the supported security algorithms; and
    receive an AS security mode command message upon receipt of the NAS registration message based on the second list provided to the network.

13. A mobile radio communications of claim 12, wherein the second list expressly indicates the unsupported security algorithms.

14. A mobile radio communications network device, comprising:
    a processor configured to:
    signal to a mobile radio communications device arranged to operate within the network a first list of supported security algorithms including both an Access-Stratum (AS) and Non-Access-Stratum (NAS) security container, the network being an upgraded network and the mobile radio communications device being a non-upgraded device; and
    receive an AS confirmation message, which is not integrity protected, and subsequently sending a NAS registration update message and a second list including supported security algorithms and unsupported security algorithms in the mobile radio communications device, the unsupported security algorithms being indicated separately from the supported security algorithms; and generate and send an AS security mode command message upon receipt of the NAS registration message based on the second list provided to the network.

15. A mobile radio communications of claim 14, wherein the second list expressly indicates the unsupported security algorithms.

* * * * *